(12) United States Patent  
Persson et al.

(10) Patent No.: US 10,298,358 B2  
(45) Date of Patent: May 21, 2019

(54) CHANGE INDICATOR FOR SYSTEM INFORMATION IN A CELLULAR INTERNET OF THINGS (CIOT) NETWORK

(71) Applicant: TELEFONAKTIEBOLAGET LM ERICSSON (PUBL), Stockholm (SE)

(72) Inventors: Claes-Göran Persson, Mjölby (SE); Nicklas Johansson, Brokind (SE); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 15/400,878

(22) Filed: Jan. 6, 2017

(65) Prior Publication Data

US 2017/0201345 A1    Jul. 13, 2017

Related U.S. Application Data

(60) Provisional application No. 62/276,149, filed on Jan. 7, 2016.

(51) Int. Cl.
*H04L 1/00* (2006.01)
*H04L 1/16* (2006.01)
(Continued)

(52) U.S. Cl.
CPC .......... *H04L 1/0034* (2013.01); *H04L 1/1614* (2013.01); *H04W 48/12* (2013.01); *H04W 52/0229* (2013.01); *Y02D 70/1222* (2018.01); *Y02D 70/1224* (2018.01); *Y02D 70/1226* (2018.01); *Y02D 70/1262* (2018.01); *Y02D 70/146* (2018.01); *Y02D 70/21* (2018.01); *Y02D 70/24* (2018.01)

(58) Field of Classification Search
None
See application file for complete search history.

(56) References Cited

U.S. PATENT DOCUMENTS

2014/0307621 A1*  10/2014  Frenger ................... H04W 4/70  
                                                 370/328  
2015/0257173 A1*   9/2015  You ....................... H04L 1/1864  
                                                 370/330  
(Continued)

FOREIGN PATENT DOCUMENTS

WO        2013/105914 A2      7/2013  
WO   WO 2015143244 A1  *   9/2015   ............ H04W 16/24

OTHER PUBLICATIONS

Ericsson LM et al., "New Work Item on Extended Coverage GSM (EC-GSM) for support of Cellular Internet of Things", GP-151039 (Revision of GP-150994), 3GPP TSG GERAN#67, Yinchuan, P.R. China, Aug. 10-14, 2015 , the whole document.

(Continued)

*Primary Examiner* — Alpus Hsu  
*Assistant Examiner* — Camquyen Thai

(57) ABSTRACT

A radio access network node (e.g., base station subsystem) and method are described herein for indicating to a mobile station (e.g., CIoT device) which system information (SI) message(s) (if any) has changed relative to the mobile station's last reading. In addition, a mobile station (e.g., CIoT device) and method are described herein for receiving an indication that indicates which system information (SI) message(s) (if any) has changed relative to the mobile station's last reading.

38 Claims, 5 Drawing Sheets

(51) Int. Cl.
*H04W 48/12* (2009.01)
*H04W 52/02* (2009.01)

(56) References Cited

U.S. PATENT DOCUMENTS

2016/0073326 A1* 3/2016 Vannithamby ........ H04W 4/005
370/312
2016/0095076 A1* 3/2016 Xiong ..................... H04W 4/70
370/336
2016/0302234 A1* 10/2016 Martinez Tarradell .......................
H04W 74/006

OTHER PUBLICATIONS

Ericsson LM: "Introduction of system information for EC-EGPRS", 3GPP Draft; GP-151112 CR44018 REL-13 System Information for EC-EGPRS REV1, 3rd Generation Partnership Project (3GPP), Mobile Competence Centre; 650, Route Des Lucioles; F-06921 Sophia-Antipolis Cedex; France, vol. TSG GERAN, No. Anaheim, United States; Nov. 16, 2015.

INTEL Corporation: "System Information design and impacts for NB-IOT", 3GPP DRAFT, R2-156352_NB-IOT SystemInformation_Intel, 3rd Generation Partnership Project (3GPP), Mobile Competence Centre; 650, Route Des Lucioles; F-06921 Sophia-Antipolis Cedex; France, vol. RAN WG2, No. Anaheim, United States; Nov. 16, 2015.

INTEL Corporation: System Information modification for Release-13 low complexity UEs and enhanced coverage:, 3GPP DRAFT; R2-154378_LC-MTCE2_SIB-Modifcation_Intel, 3rd Generation Partnership Project (3GPP), Mobile Competence Centre; 650, Route Des Lucioles; F-06921 Sophia-Antipolis Cedex; France, vol. RAN WG2, No. Malmo, Sweden; Oct. 4, 2015.

* cited by examiner

FIG. 3

| ROW | TIME (h) | EC-SI TYPE 4 MESSAGE (208) | EC-SI TYPE 3 MESSAGE (206) | EC-SI TYPE 2 MESSAGE (204) | EC-SI TYPE 1 MESSAGE (202) | OVERFLOW CONTROL (215) | |
|---|---|---|---|---|---|---|---|
| 1 | | 0 | 0 | 0 | 0 | 0 | |
| 2 | T=0 | 0 | 0 | 1 | 0 | 0 | FIRST CHANGE OF EC-SI TYPE 2 |
| 3 | | 0 | 0 | 1 | 1 | 0 | FIRST CHANGE OF EC-SI TYPE 1 |
| 4 | | 0 | 1 | 0 | 1 | 1 | SECOND CHANGE OF EC-SI TYPE 2, OVERFLOW CONTROL BIT CHANGED |
| 5 | | 0 | 1 | 1 | 1 | 1 | FIRST CHANGE OF EC-SI TYPE 3, OVERFLOW CONTROL BIT UNCHANGED |
| 6 | T<24 | 0 | 1 | 1 | 1 | 1 | THIRD CHANGE OF EC-SI TYPE 2, OVERFLOW CONTROL BIT UNCHANGED |
| 7 | T+24 | 0 | 1 | 1 | 1 | 1 | > 24 HOURS HAS PASSED SINCE THE LAST CHANGE, i.e., ALL Ms HAVE READ THE LAST EC-SI CHANGE → THE BITMAP AND THE OVERFLOW CONTROL BIT IS "FROZEN" |
| 8 | T=0 | 0 | 1 | 1 | 0 | 1 | FIRST CHANGE OF EC-SI TYPE 1 |
| 9 | T<24 | 0 | 1 | 0 | 0 | 1 | FIRST CHANGE OF EC-SI TYPE 2 |
| 10 | T+24 | 0 | 1 | 0 | 0 | 1 | > 24 HOURS HAS PASSED SINCE THE LAST CHANGE, i.e., ALL Ms HAVE READ THE LAST EC-SI CHANGE → THE BITMAP AND THE OVERFLOW CONTROL BIT IS "FROZEN" |

Rows 2–7: FIRST EC-SI CCC
Rows 8–10: SECOND EC-SI CCC

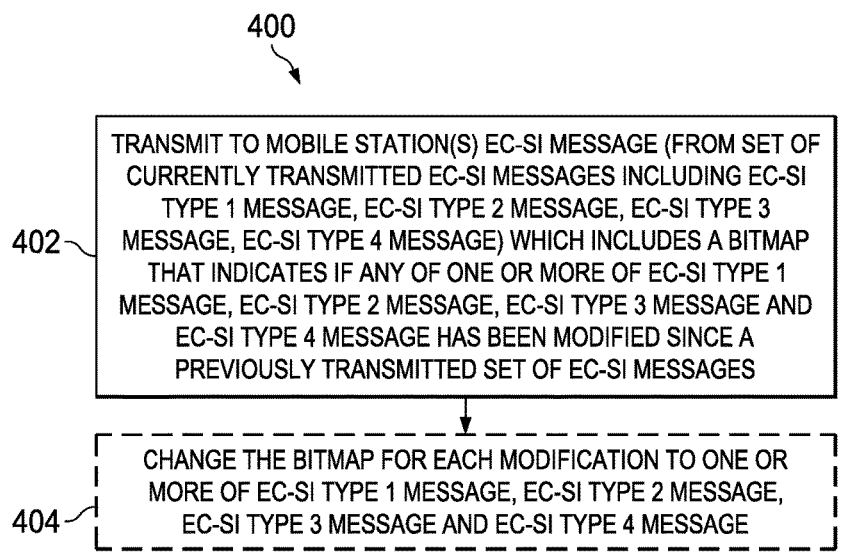
FIG. 4
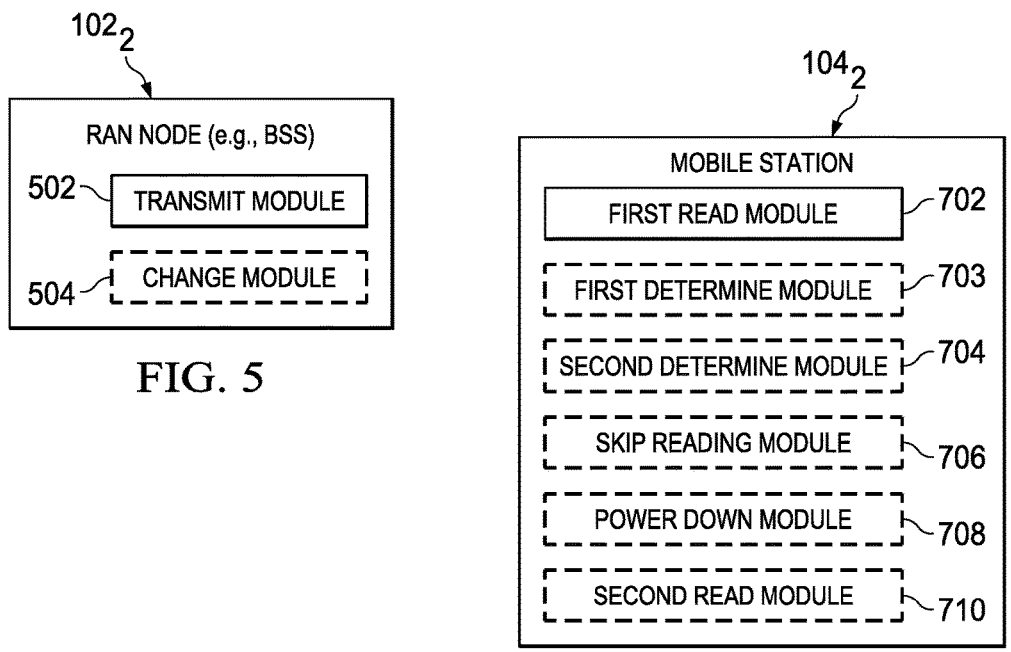
FIG. 5
FIG. 7

CHANGE INDICATOR FOR SYSTEM INFORMATION IN A CELLULAR INTERNET OF THINGS (CIOT) NETWORK

CLAIM OF PRIORITY

This application claims the benefit of priority to U.S. Provisional Application Ser. No. 62/276,149, filed on Jan. 7, 2016, the entire contents of which are hereby incorporated herein by reference for all purposes.

TECHNICAL FIELD

The present disclosure relates to a radio access network node (e.g., base station subsystem) and method for indicating to a mobile station (e.g., CIoT device) which system information (SI) message(s) (if any) has changed relative to the mobile station's last reading. In addition, the present disclosure relates to a mobile station (e.g., CIoT device) and method for receiving an indication that indicates which system information (SI) message(s) (if any) has changed relative to the mobile station's last reading.

BACKGROUND

The following abbreviations and terms are herewith defined, at least some of which are referred to within the following description of the present disclosure.

| | |
|---|---|
| 3GPP | 3rd-Generation Partnership Project |
| AGCH | Access Grant Channel |
| ASIC | Application Specific Integrated Circuit |
| BLER | Block Error Rate |
| BSS | Base Station Subsystem |
| CC | Coverage Class |
| CCC | Change Control Cycle |
| CIoT | Cellular Internet of Things |
| CN | Core Network |
| DRX | Discontinuous Reception |
| EC | Extended Coverage |
| EC-BCCH | Extended Coverage Broadcast Control Channel |
| EC-GSM | Extended Coverage Global System for Mobile Communications |
| EC-PCH | Extended Coverage Paging Channel |
| EC-SCH | Extended Coverage Synchronization Channel |
| EC-SI | Extended Coverage System Information |
| eDRX | Extended Discontinuous Reception |
| eNB | Evolved Node B |
| DL | Downlink |
| DSP | Digital Signal Processor |
| EDGE | Enhanced Data rates for GSM Evolution |
| EGPRS | Enhanced General Packet Radio Service |
| GSM | Global System for Mobile Communications |
| GERAN | GSM/EDGE Radio Access Network |
| GPRS | General Packet Radio Service |
| HARQ | Hybrid Automatic Repeat Request |
| IoT | Internet of Things |
| LTE | Long-Term Evolution |
| MCS | Modulation and Coding Scheme |
| MME | Mobility Management Entity |
| MS | Mobile Station |
| MTC | Machine Type Communications |
| NB | Node B |
| PDN | Packet Data Network |
| PDTCH | Packet Data Traffic Channel |
| RACH | Random Access Channel |
| RAN | Radio Access Network |
| RAT | Radio Access Technology |
| SGSN | Serving GPRS Support Node |
| SI | System Information |
| TDMA | Time Division Multiple Access |
| TS | Technical Specifications |
| UE | User Equipment |
| UL | Uplink |
| WCDMA | Wideband Code Division Multiple Access |
| WiMAX | Worldwide Interoperability for Microwave Access |

Coverage Class (CC): At any point in time a mobile station belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a mobile station determines the uplink/downlink coverage class applicable to the RACH/AGCH based on estimating the number of blind transmissions of a radio block needed by the BSS (radio access network node) receiver/mobile station receiver to experience a BLER (block error rate) of approximately 10%. The BSS determines the uplink/downlink coverage class to be used by a mobile station on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a mobile station operating with radio interface performance attributes corresponding to the reference coverage (normal coverage) is considered to be in the best coverage class (i.e., coverage class 1) and therefore does not make any additional blind transmissions subsequent to an initial blind transmission. In this case, the mobile station may be referred to as a normal coverage mobile station. In contrast, a mobile station operating with radio interface performance attributes corresponding to an extended coverage (i.e., coverage class greater than 1) makes multiple blind transmissions. In this case, the mobile station may be referred to as an extended coverage mobile station. Multiple blind transmissions correspond to the case where N instances of a radio block are transmitted consecutively using the applicable radio resources (e.g., the paging channel) without any attempt by the transmitting end to determine if the receiving end is able to successfully recover the radio block prior to all N transmissions. The transmitting end does this in attempt to help the receiving end realize a target BLER performance (e.g., target BLER≤10% for the paging channel).

DRX cycle: Discontinuous reception (DRX) is a process of a mobile station disabling its ability to receive when it does not expect to receive incoming messages and enabling its ability to receive during a period of reachability when it anticipates the possibility of message reception. For DRX to operate, the network coordinates with the mobile station regarding when instances of reachability are to occur. The mobile station will therefore wake up and enable message reception only during pre-scheduled periods of reachability. This process reduces the power consumption which extends the battery life of the mobile station and is sometimes called (deep) sleep mode.

Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Cellular Internet of Things (CIoT) devices: CIoT devices are IoT devices that establish connectivity using cellular networks.

Machine Type Communication (MTC) devices: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

At the Third Generation Partnership Project (3GPP) Technical Specification Group (TSG) GSM/EDGE Radio Access Network (GERAN) meeting #67, a new work item entitled "New Work Item on Extended Coverage GSM (EC-GSM) for support of Cellular Internet of Things" (CIoT) was discussed and approved in GP-151039 (dated: Aug. 10-14, 2015) with the intention to improve coverage with 20 dB, to improve device battery life time, and to decrease device complexity. The contents of GP-151039 are hereby incorporated herein by reference for all purposes.

Extended coverage (i.e., a coverage range beyond that of legacy General Packet Radio Service (GPRS)/Enhanced GPRS (EGPRS) operation) is achieved by blind physical layer repetitions in both uplink (UL) and downlink (DL), where the number of repetitions is associated with a given Coverage Class (CC). Logical channels supporting operation in extended coverage are referred to as Extended Coverage (EC)-channels. Four different Coverage Classes are defined in the ongoing 3GPP standardization work, each Coverage Class approximated with a level of extended coverage range compared to legacy GPRS/EGPRS operation, which are denoted as CC1, CC2, CC3 and CC4 respectively. More specifically, CC1 corresponds to the coverage range of legacy GPRS/EGPRS operation (i.e., extended coverage and blind repetitions not used). CC2 has four blind repetitions for the EC-RACH, EC-PDTCH and EC-PACCH, and eight blind repetitions for the EC-PCH and EC-AGCH. CC3 has sixteen blind repetitions for the EC-RACH, eight blind transmissions for the EC-PDTCH and EC-PACCH, and sixteen blind repetitions for the EC-PCH and EC-AGCH. CC4 has forty-eight blind transmissions for the EC-RACH, 16 blind repetitions for the EC-PDCTH and EC-PACCH, and thirty-two blind transmissions on the EC-PCH and EC-AGCH.

For some logical channels, the number of blind physical layer repetitions can vary depending on the coverage extension required. But for the Extended Coverage Broadcast Control Channel (EC-BCCH), which carries all the system information (SI) needed for the Mobile Station (MS)/CIoT device to gain access to the Extended Coverage Global System for Mobile (EC-GSM) communications system, the number of blind physical layer repetitions is always fixed to 16 (i.e., in order to reach mobile stations in extended coverage corresponding to the highest Coverage Class (CC4), each EC-BCCH block comprising a complete or a segment of an EC-SI message is always repeated over 16 consecutive 51-multiframes).

In the current standardization work for EC-GSM, four system information (SI) messages are defined, denoted as EC-System Information Type 1 (EC-SI 1), EC-System Information Type 2 (EC-SI 2), EC-System Information Type 3 (EC-SI 3) and EC-System Information Type 4 (EC-SI 4).

The EC-SI messages are either sent on a single EC-BCCH block per 51-multiframe (known as EC-BCCH Normal) or optionally on two EC-BCCH blocks per 51-multiframe (the second EC-BCCH block is known as EC-BCCH Extended). Each EC-SI message is repeated over 16 consecutive EC-BCCH blocks in 16 consecutive 51-multiframes in a Round Robin scheme. An example of EC-System Information (EC-SI) message transmission is provided below in TABLE #1.

TABLE #1

| 51-multiframe | EC-BCCH normal | EC-BCCH Extended |
| --- | --- | --- |
| N + 0-N + 15 | EC-System Information 1 | EC-System Information 2 |
| N + 16-N + 31 | EC-System Information 3 | EC-System Information 4 |
| N + 32-N + 47 | EC-System Information 1 | EC-System Information 2 |
| N + 48-N + 63 | EC-System Information 3 | EC-System Information 4 |
| N + 64-N + 79 | EC-System Information 1 | EC-System Information 2 |
| ... | ... | ... |
| ... | ... | ... |

The signaling in TABLE #1 is just one example of how to broadcast EC-System Information in a cell. If BCCH Extended is not activated in the cell, then all EC-SI messages (EC-SI 1-EC-SI 4) will instead be sent on the EC-BCCH Normal block in a Round Robin scheme.

The EC-SI is broadcasted in each cell within the EC-GSM system, carrying network related information such as network identity parameters, cell selection parameters, power control parameters, neighbor cells, etc. When the mobile station (MS) enters a new cell at e.g., power on or at cell re-selection, the MS needs to read the complete EC-System Information set (i.e., all EC-SI messages) before accessing the cell.

Discontinuous Reception (DRX) is a power saving technique that allows the MS to power down for a certain period of time while being in idle mode. The period of time when the MS is powered down is commonly called the "sleep mode". When the MS wakes up from "sleep mode" according to its DRX cycle (e.g. if the MS uses a DRX cycle of 26 minutes, it wakes up once every 26 minutes) in the same cell as the one in which it previously read the complete EC-System Information, the MS needs to read an EC-SI change mark indicator included in the EC-Synchronization Channel (EC-SCH) before accessing the cell (EC-SCH is a logical channel transmitted on the same carrier as the EC-BCCH providing information such as frequency and base station identity). The EC-SI change mark indicator is a 2-bit field with a value range from 0 to 3 that is stepped whenever the network changes the content of an EC-SI message. If the value of the EC-SI change mark indicator is unchanged since the last time the indicator was read, the MS concludes that the content of the EC-SI message set has not been changed. But if the MS detects a change to the EC-SI change mark indicator when reading the EC-SCH, then the MS understands that the content of at least one EC-SI message has changed, thus the MS needs to re-read all the EC-SI messages in the cell before accessing the network.

The problem with the existing solution is that the change of the EC-SI change mark indicator field in the EC-SCH does not indicate which specific EC-SI message has been changed, i.e., the MS needs to read the complete EC-SI message (EC-SI 1-EC-SI 4) set regardless if only the content of one EC-SI message is in fact changed.

The time period during which the network can change the content of the EC-System Information (up to a certain maximum number of times) without overflowing the EC-SI change mark indicator, is here defined as the EC-SI Change Control Cycle. The length of the EC-SI Change Control Cycle is effectively selected by the network and serves as the time interval during which the network intends to avoid changing the EC-System Information more often than a certain maximum number of times (e.g., if the EC-SI Change Control Cycle is 24 hours long the network avoids overflowing the EC-SI change mark indicator by not changing the EC-System Information more often than 3 times during that time period).

In general, it is an advantage if the MS can avoid reading the complete EC-System Information message set (EC-SI 1-EC-SI 4) too frequently. This is not only due to the network access delay when the MS needs to re-read the complete EC-SI message set (the time required for reading four EC-SI messages on EC-BCCH Normal is approximately 16 seconds for an MS using the worst coverage class (CC4), assuming one EC-BCCH block carries one complete EC-SI message), the MS will also waste valuable battery power when acquiring and decoding EC-SI messages that are in fact unchanged, thus always reading the complete EC-SI message set (EC-SI 1-EC-SI 4) will have a negative impact on the MS's battery life time. These problems and other problems are addressed by the present disclosure.

SUMMARY

A RAN node (e.g., BSS), a mobile station, and various methods for addressing the aforementioned problems are described in the independent claims. Advantageous embodiments of the RAN node (e.g., BSS), the mobile station and various methods are further described in the dependent claims.

In one aspect, the present disclosure provides a RAN node configured to interact with one or more mobile stations. The RAN node comprises a processor and a memory that stores processor-executable instructions, wherein the processor interfaces with the memory to execute the processor-executable instructions, whereby the RAN node is operable to transmit, to the one or more mobile stations, an EC-SI message on an EC-BCCH. The transmitted EC-SI message is from a set of currently transmitted EC-SI messages including an EC-SI type 1 message, an EC-SI type 2 message, an EC-SI type 3 message, and an EC-SI type 4 message. In addition, the transmitted EC-SI message includes a bitmap that indicates which, if any, of one or more of the EC-SI type 1 message, the EC-SI type 2 message, the EC-SI type 3 message, and the EC-SI type 4 message from the set of currently transmitted EC-SI messages has been modified since a previously transmitted set of EC-SI messages. An advantage of the RAN node performing the transmit operation is that the one or more mobile stations can read the transmitted EC-SI message and avoid wasting valuable battery power by not having to acquire and decode EC-SI message(s) that are in fact unchanged.

In another aspect, the present disclosure provides a method in a RAN node configured to interact with one or more mobile stations. The method comprises a step of transmitting, to the one or more mobile stations, an EC-SI message on an EC-BCCH. The transmitted EC-SI message is from a set of currently transmitted EC-SI messages including an EC-SI type 1 message, an EC-SI type 2 message, an EC-SI type 3 message, and an EC-SI type 4 message. In addition, the transmitted EC-SI message includes a bitmap that indicates which, if any, of one or more of the EC-SI type 1 message, the EC-SI type 2 message, the EC-SI type 3 message, and the EC-SI type 4 message from the set of currently transmitted EC-SI messages has been modified since a previously transmitted set of EC-SI messages. An advantage of the RAN node performing the transmitting step is that the one or more mobile stations can read the transmitted EC-SI message and avoid wasting valuable battery power by not having to acquire and decode EC-SI message(s) that are in fact unchanged.

In yet another aspect, the present disclosure provides a mobile station which comprises a processor and a memory that stores processor-executable instructions, wherein the processor interfaces with the memory to execute the processor-executable instructions, whereby the mobile station is operable to perform a read operation. In the read operation, the mobile station reads an EC-SI message on an EC-BCCH. The read EC-SI message is from a set of currently transmitted EC-SI messages including an EC-SI type 1 message, an EC-SI type 2 message, an EC-SI type 3 message, and an EC-SI type 4 message. In addition, the read EC-SI message includes a bitmap that indicates which if any of one or more of the EC-SI type 1 message, the EC-SI type 2 message, the EC-SI type 3 message, and the EC-SI type 4 message from the set of currently transmitted EC-SI messages has been modified since a previously transmitted set of EC-SI messages. An advantage of the mobile station performing the read operation is that it can use the bitmap in the read EC-SI message to avoid wasting valuable battery power by not having to acquire and decode EC-SI message(s) that are in fact unchanged.

In still yet another aspect, the present disclosure provides a method in a mobile station, wherein the method comprises a step of reading an EC-SI message on an EC-BCCH. The read EC-SI message is from a set of currently transmitted EC-SI messages including an EC-SI type 1 message, an EC-SI type 2 message, an EC-SI type 3 message, and an EC-SI type 4 message. In addition, the read EC-SI message includes a bitmap that indicates which, if any, of one or more of the EC-SI type 1 message, the EC-SI type 2 message, the EC-SI type 3 message, and the EC-SI type 4 message from the set of currently transmitted EC-SI messages has been modified since a previously transmitted set of EC-SI messages. An advantage of the mobile station performing the reading step is that it can use the bitmap in the read EC-SI message to avoid wasting valuable battery power by not having to acquire and decode EC-SI message(s) that are in fact unchanged. Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 3 is a diagram that exemplifies a bitmap comprising a 4 bit change mark indicator (each EC-SI message has a corresponding single bit change mark indicator) and a common overflow control bit (common for all EC-SI messages) for an EC-SI message change scenario comprising four EC-SI messages namely EC-SI type 1 message, an EC-SI type 2 message, an EC-SI type 3 message, and an EC-SI type 4 message in accordance with an embodiment of the present disclosure;

FIG. 4 is a flowchart of a method implemented in the RAN node in accordance with an embodiment of the present disclosure;

FIG. 5 is a block diagram illustrating a structure of the RAN node configured in accordance with an embodiment of the present disclosure;

DETAILED DESCRIPTION

Figure 1:
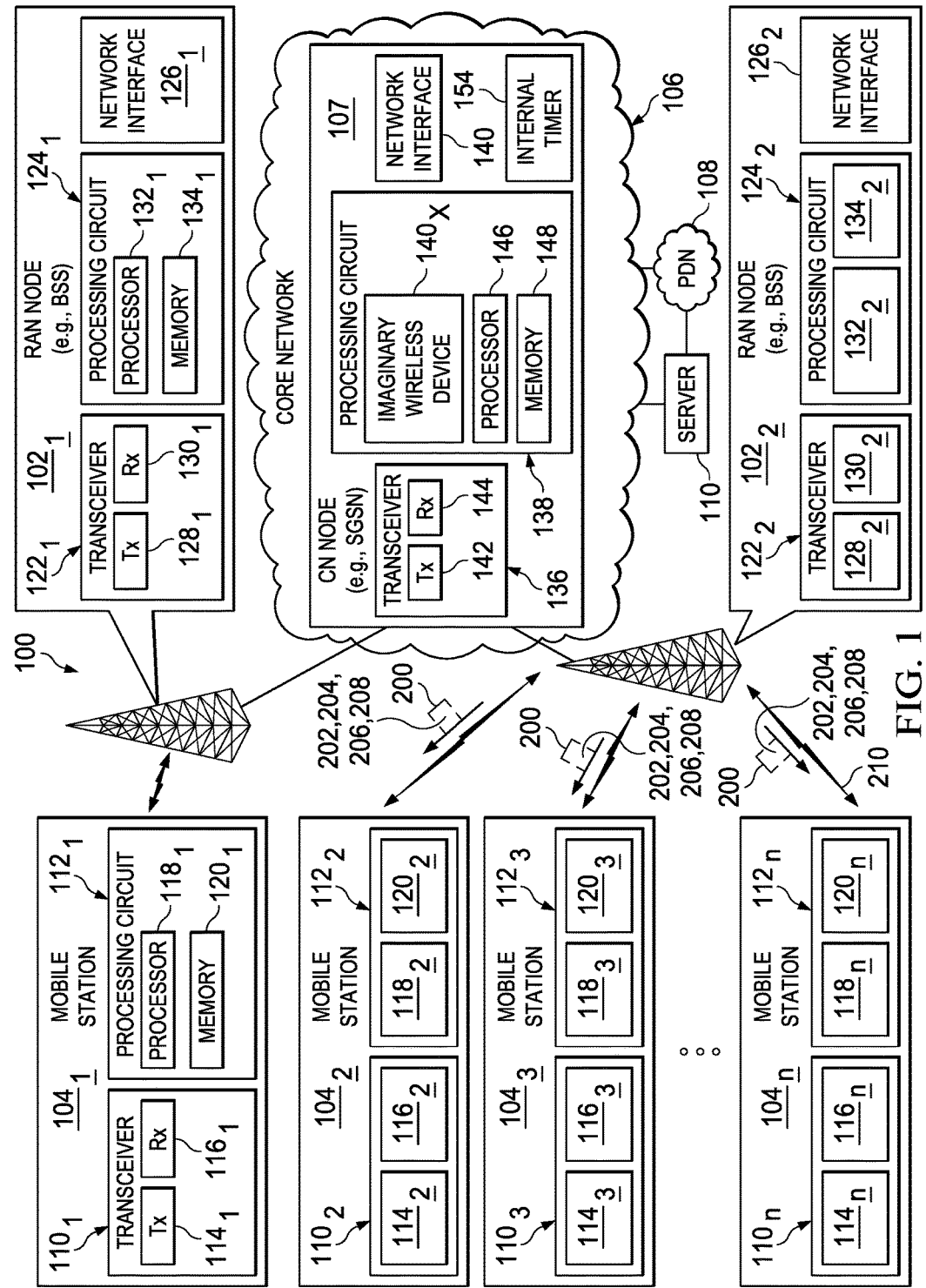
FIG. 1 is a diagram of an exemplary wireless communication network which includes a CN node, multiple RAN nodes, and multiple mobile stations configured in accordance with an embodiment of the present disclosure.

A discussion is provided herein first to describe an exemplary wireless communication network that includes a CN node (e.g., SGSN, MME), multiple RAN nodes (e.g., BSSs, NodeBs, eNodeBs), and multiple mobile stations (e.g., wireless devices, MTC devices, CIoT devices) in accordance with an embodiment of the present disclosure (see FIG. 1). Then, a discussion is provided to disclose various techniques that the RAN nodes (e.g., BSSs, NodeBs, eNodeBs) can use for indicating to a mobile station (e.g., CIoT device) which system information (SI) message (if any) has changed relative to the mobile station's last reading in accordance with different embodiments of the present disclosure (see FIGS. 2-3). Thereafter, a discussion is provided to explain the basic functionalities-configurations of the RAN node (e.g., BSSs, NodeBs, eNodeBs) and the mobile station in accordance with different embodiments of the present disclosure (see FIGS. 4-7).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple mobile stations $104_1$, $104_2$, $104_3$ . . . $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, EC-GSM, WCDMA, LTE, and WiMAX systems.

The wireless communication network 100 includes the RAN nodes $102_1$ and $102_2$ (wireless access nodes—only two shown) which provide network access to the mobile stations $104_1$, $104_2$, $104_3$ . . . $104_n$. In this example, the RAN node $102_1$ is providing network access to mobile station $104_1$ while the RAN node $102_2$ is providing network access to mobile stations $104_2$, $104_3$ . . . $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The mobile stations $104_1$, $104_2$, $104_3$ . . . $104_n$ may communicate with one or more servers 110 (only one shown) connected to the core network 106 and/or the PDN 108.

The mobile stations $104_1$, $104_2$, $104_3$ . . . $104_n$ may refer generally to an end terminal (user) that attaches to the wireless communication network 100, and may refer to either a MTC device (e.g., a smart meter) or a non-MTC device. Further, the term "mobile station" is generally intended to be synonymous with the term mobile device, wireless device. "User Equipment," or UE, as that term is used by 3GPP, and includes standalone mobile stations, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each mobile station $104_1$, $104_2$, $104_3$ . . . $104_n$ may include a transceiver circuit $110_1$, $110_2$, $110_3$ . . . $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding mobile station $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard, and the EC-GSM standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding mobile station $104_1$, $104_2$, $104_3$ ... $104_n$. The program code may include code for performing the procedures as described hereinafter.

Each RAN node $102_1$ and $102_2$ (wireless access node $102_1$ and $102_2$) may include a transceiver circuit $122_1$ and $122_2$ for communicating with mobile stations $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard, and the EC-GSM standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter.

The CN node 107 (e.g., SGSN 107, MME 107) may include a transceiver circuit 136 for communicating with the RAN nodes $102_1$ and $102_2$, a processing circuit 138 for processing signals transmitted from and received by the transceiver circuit 136 and for controlling the operation of the CN node 107, and a network interface 140 for communicating with the RAN nodes $102_1$ and $102_2$. The transceiver circuit 136 may include a transmitter 142 and a receiver 144, which may operate according to any standard, e.g., the GSM/EDGE standard, and the EC-GSM standard. The processing circuit 138 may include a processor 146 and a memory 148 for storing program code for controlling the operation of the CN node 107. The program code may include code for performing the procedures as described hereinafter.

Techniques for Indicating Which SI Message(s) has Changed

When the MS $104_2$ (for example) is required to determine which of the EC-System Information messages 200 has changed due to detecting a change of the EC-SI change mark indicator in the EC-SCH, the MS $104_2$ will start acquiring the EC-SI messages which are sent on the EC-BCCH 210 by the RAN node $102_2$ (for example). Since the EC-SI messages 200 are sent using a Round Robin scheduling algorithm, the order in which the MSs $104_2$, $104_3$ ... $104_n$ read and decode the EC-SI messages 200 transmitted on the EC-BCCH will differ between MSs $104_2$, $104_3$ ... $104_n$. For example, one MS $104_2$ may start reading the EC-SI message set 200 by first reading the EC-System Information Type 1 message 202 while another MS $104_3$ may start its reading from e.g., the EC-System Information Type 3 message $20_6$. The following is a detailed discussion about five different embodiments of the present disclosure related to the configuration of the EC-SI message set 200 including the EC-SI type 1 message 202, the EC-SI type 2 message 204, the EC-SI type 3 message 206, and the EC-SI type 4 message 208 (see FIG. 2).

Figure 2:
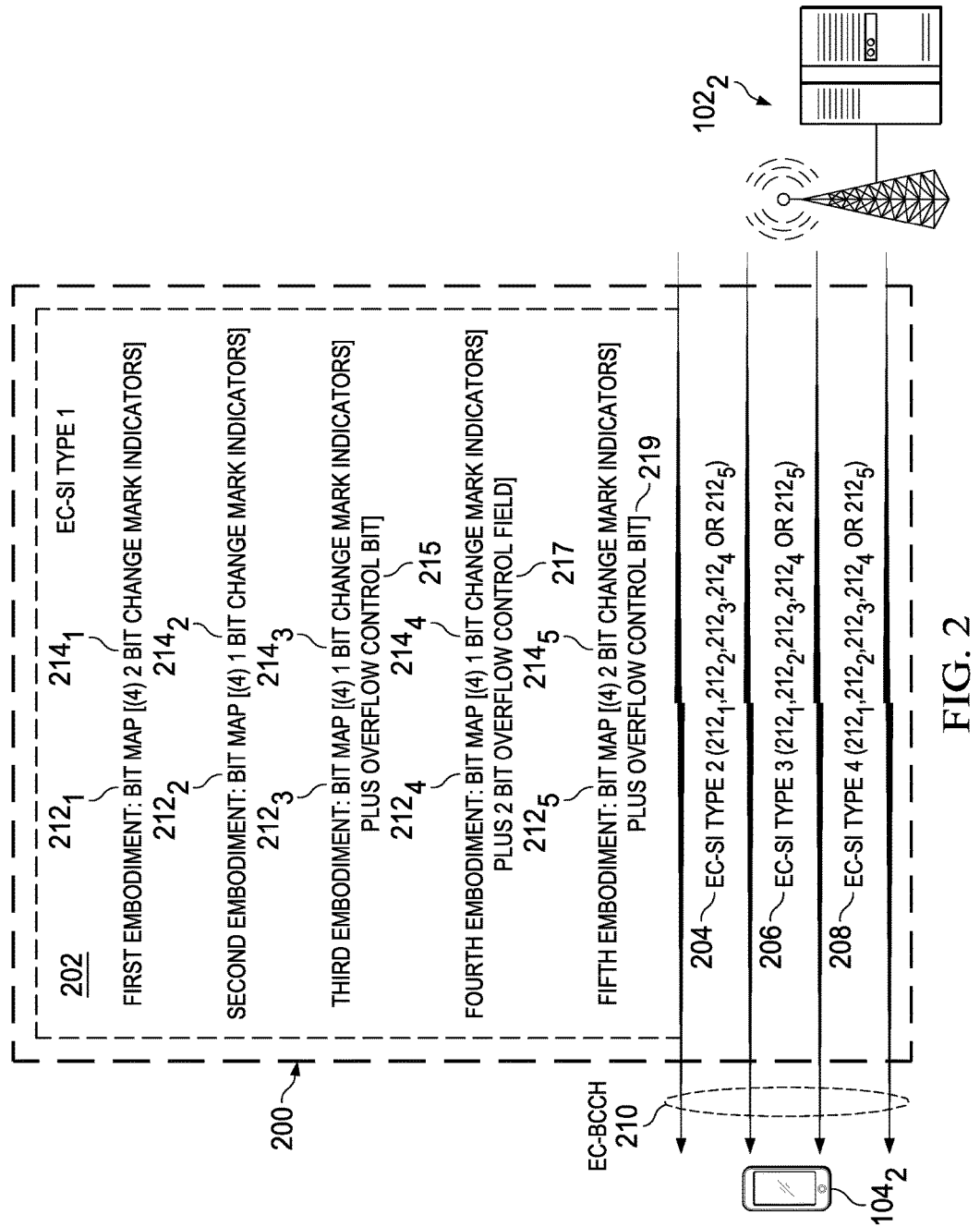
FIG. 2 is a diagram showing the RAN node transmitting an EC-SI message set including an EC-SI type 1 message, an EC-SI type 2 message, an EC-SI type 3 message, and an EC-SI type 4 message each sent on the EC-BCCH to multiple mobile stations (one shown) and having a bitmap in accordance with different embodiments of the present disclosure.

In a first embodiment of the present disclosure, an 8-bit bitmap $212_1$ is included in each EC-SI message 202, 204, 206, 208, providing a 2-bit change mark indicator $214_1$ for each EC-SI message 202, 204, 206, 208 (i.e., in each instance of EC-SI type 1 message 202, EC-SI type 2 message 204, EC-SI type 3 message 206, and EC-SI type 4 message 208) transmitted on the EC-BCCH 210 (see FIG. 2). When the content of a given EC-SI message 202, 204, 206 and/or 208 is changed by the network 106 (e.g., RAN node $102_2$), the 2-bit change mark indicator $214_1$ for that EC-SI message 202, 204, 206 and/or 208 is changed (e.g., incremented) in all the EC-SI messages 202, 204, 206, and 208 (i.e., EC-SI type 1 message 202, EC-SI type 2 message 204, EC-SI type 3 message 206, and EC-SI type 4 message 208) transmitted in the cell.

Consequently, when the MS $104_2$ reads the bitmap $212_1$ in the first decoded EC-SI message 202 (e.g., EC-SI type 1 message 202) transmitted on the EC-BCCH 210, the MS $104_2$ will know which EC-SI message(s) 202, 204, 206 and/or 208 have in fact changed and which EC-SI message(s) 202, 204, 206 and/or 208 have not changed.

With this solution, the network 106 will be able to inform the MS $104_2$ of up to three individual changes per EC-SI message 202, 204, 206, 208 during a given time frame, i.e., during one EC-SI Change Control Cycle.

If the MS $104_2$ determines that only the content of the EC-SI message 202 (for example—EC-SI type 1 message 202) currently read by the MS $104_2$ has changed, then the MS $104_2$ does not need to read the remaining EC-SI messages 204, 206, 208 (i.e., EC-SI type 2 message 204, EC-SI type 3 message 206, and EC-SI type 4 message 208) transmitted on the EC-BCCH 210. This will save battery capacity and reduce network access time for the MS $104_2$.

The battery savings gained from this use case is more obvious for an MS $104_2$ in a high Coverage Class (e.g., CC4) since that MS $104_2$ does not need to read x times 16 consecutive EC-BCCH blocks for each of the subset of EC-SI messages 204, 206, 208 (for example) that in fact have not changed.

If the MS $104_2$ determines that one of the other EC-SI messages 206 (for example—EC-SI type 3 206) has changed (i.e., regardless if the EC-SI message 202 currently read by the MS $104_2$ is changed or not), then the MS $104_2$ can power down until the concerned (i.e., changed) EC-SI message 206 (EC-SI type 3 206) is transmitted on the EC-BCCH 210. This will save battery capacity for the MS $104_2$ and in most cases (e.g., when the remaining EC-SI message(s) 204 and 208 in the EC-SI message set 200 is/are unchanged) also reduce the network 106 access time for the MS $104_2$.

It should be observed that all EC-SI messages 202, 204, 206, 208 sent on the EC-BCCH 210 are sent by the RAN node $102_2$ (e.g., BSS $102_2$) with a predictable periodicity (e.g., by using a Round Robin algorithm). This implies that the exact time for transmission of each individual EC-SI message 202, 204, 206, 208 is known by the MS $104_2$ once the MS $104_2$ has accessed a cell.

In a second embodiment of the present disclosure, a 4-bit bitmap $212_2$ is included in each EC-SI message 202, 204, 206, 208, providing a 1-bit change mark indicator $214_2$ for each EC-SI message 202, 204, 206, 208 (i.e., in each instance of EC-SI type 1 message 202, EC-SI type 2 message 204, EC-SI type 3 message 206, and EC-SI type 4 message 208) transmitted on the EC-BCCH 210 (see FIG.

2). When the content of a given EC-SI message 202, 204, 206 and/or 208 is changed by the network 106 (e.g., RAN node 102₂), the single bit change mark indicator 214₂ for that EC-SI message 202, 204, 206 and/or 208 is changed in all EC-SI messages 202, 204, 206 and 208 transmitted in the cell. Consequently, when the MS 104₂ reads the bitmap 212₂ in the first decoded EC-SI message 202 (e.g., EC-SI type 1 message 202) transmitted on the EC-BCCH 210, the MS 104₂ will know which EC-SI message(s) 202, 204, 206 and/or 208 have in fact changed and which EC-SI message(s) 202, 204, 206 and/or 208 have not changed.

Compared to the solution in the first embodiment, this alternative requires fewer bits (i.e., 4 bits) in the bitmap 212₂ included in each EC-SI message 202, 204, 206, and 208. On the other hand, since a change of a given EC-SI message 202, 204, 206 and/or 208 is indicated by a single bit in the bitmap 212₂, the change mark indicator 214₂ can only indicate one change per EC-SI message 202, 204, 206, 208 during a given time frame, i.e., during one EC-SI Change Control Cycle.

In a third embodiment of the present disclosure, a 5-bit bitmap 212₃ providing a 1 bit change mark indicator 214₃ per EC-SI message 202, 204, 206, 208, and an overflow control bit 215 is included in each EC-SI message 202, 204, 206, 208 (i.e., in each instance of EC-SI type 1 message 202, EC-SI type 2 message 204, EC-SI type 3 message 206, and EC-SI type 4 message 208) transmitted on the EC-BCCH 210 thus providing additional change mark information to the MS 104₂ (for example) (see FIG. 2).

When the content of a given EC-SI message 202, 204, 206 and/or 208 is changed by the network 106 (e.g., RAN node 102₂), the 1 bit change mark indicator 214₃ for that EC-SI message 202, 204, 206 and/or 208 is changed in all EC-SI messages 202, 204, 206 and 208 transmitted in the cell. An MS 104₂ (for example) reading an EC-SI message 202, 204, 206 or 208 will then know which EC-SI message(s) 202, 204, 206 and/or 208 is changed, and consequently, the MS 104₂ may only read the changed EC-SI message(s) 202, 204, 206 and/or 208.

When the same EC-SI message 202, 204, 206 or 208 is changed a second time within a certain time frame (i.e., during the same EC-SI Change Control Cycle) then the 1 bit change mark indicator 214₃ for that EC-SI message 202, 204, 206 or 208 is changed once more in all EC-SI messages 202, 204, 206 and 208 transmitted in the cell. In addition to the change of the 1 bit change mark indicator 214₃, the overflow control bit 215 is changed in all EC-SI messages 202, 204, 206 and 208. Consequently, an MS 104₂ (for example) reading an EC-SI message 202 (for example) with the changed overflow control bit 215 will now understand that the content of one or more EC-SI messages 202, 204, 206 and/or 208 has changed more than once since the EC-SI message(s) 202, 204, 206, 208 was read last time, and consequently, the MS 104₂ needs to read all of the EC-SI messages 202, 204, 206 and 208. In other words, an MS 104₃ (for example) detecting a change to the overflow control bit 215 will always need to re-read the complete EC-SI message set 200 (i.e., EC-SI type 1 message 202, EC-SI type 2 message 204, EC-SI type 3 message 206, and EC-SI type 4 message 208).

With the solution associated with the third embodiment of the present disclosure, the network 106 (e.g., RAN node 102₂) will be able to inform the MS 104₂ (for example) of one individual change per EC-SI message 202, 204, 206 and/or 208 in which case the MS 104₂ may only read the changed EC-SI message(s) 202, 204, 206 and/or 208, and one additional change per EC-SI message 202, 204, 206 or 208 in which case the overflow control bit 215 is changed (hence the MS 104₂ needs to re-read the complete EC-SI message set 200), during a given time frame, i.e., during one EC-SI Change Control Cycle.

If the network 106 (e.g., RAN node 102₂) does not change the content of any EC-SI message 202, 204, 206 and 208 during a time period spanned by the EC-SI Change Control Cycle (e.g., 24 hours) that exceeds the length of the longest DRX cycle (i.e., all MSs 104₂, 104₃ . . . 104ₙ in the cell have been able to read the latest change of the EC-SI message(s) 202, 204, 206, 208), the values of the bitmap 212₃ including the 1 bit change mark indicator 214₃ and the overflow control bit 215 are frozen ("reset" condition—discussed in more detail below) and a new EC-SI Change Control Cycle is started.

FIG. 3 is a diagram that exemplifies a 5-bit bitmap 212₃ comprising a 4 bit change mark indicator 214₃ (each EC-SI message 202, 204, 206 and 208 has a corresponding single bit change mark indicator) and a common overflow control bit 215 used to indicate an EC-SI overflow condition (common for all EC-SI messages 202, 204, 206 and 208) for an EC-SI message change scenario comprising four EC-SI messages 202, 204, 206 and 208 in accordance with the third embodiment of the present disclosure. In this example, considering the EC-SI type 2 message 204, an MS 104₂ (for example) would detect three changes to the EC-SI type 2 message 204 during the first EC-SI Change Control Cycle as follows:

Row 1 is the initial condition where the EC-SI type 2 message's 1 bit change mark indicator 214₃+overflow control bit 215=00 (note: the bitmap 212₃=00000—where in this case the $1^{st}$ bit, $2^{nd}$ bit, $3^{rd}$ bit, $4^{th}$ bit and $5^{th}$ bit corresponds to EC-SI type 4 message 208, EC-SI type 3 message 206, EC-SI type 2 message 204, EC-SI type 1 message 202, and overflow control bit 215). Note: if desired the order of the bits can take any form such that for instance the $1^{st}$ bit, $2^{nd}$ bit, $3^{rd}$ bit, $4^{th}$ bit and $5^{th}$ bit can respectively correspond to the overflow control bit 215, the EC-SI type 1 message 202, EC-SI type 2 message 204, EC-SI type 3 message 206, and EC-SI type 4 message 208. In this example the MS 104₂ (for example) reads the complete EC-SI message set 200 including the EC-SI message 202, 204, 206, and 208 and the bitmap 212₃ included therein.

Row 2 (identified by T=0 which represents the start of a first EC-SI Change Control Cycle timer) is the first change to the EC-SI type 2 message 204 where the EC-SI type 2 message's 1 bit change mark indicator 214₃+overflow control bit 215=10 (note: the bitmap 212₃=00100). At this point, a MS 104₂ (for example) that previously read the complete EC-SI message set 200 in row 1 and now reads any of the EC-SI messages 202, 204, 206 and 208 in row 2 would know that the overflow control bit 215 has not changed (i.e. an EC-SI overflow condition has not occurred) and that the EC-SI type 2 message 204 has changed and hence needs to be read to obtain the updated system information located therein. The MS 104₂ would not need to read EC-SI type 1 message 202, the EC-SI type 3 message 206, and the EC-SI type 4 message 208.

Row 4 is the second change to the EC-SI type 2 message 204 within the current EC-SI Change Control Cycle where the EC-SI type 2 message's 1 bit change mark indicator 214₃+overflow control bit 215=01 (note: the bitmap 212₃=00011). At this point, a MS 104₂ (for example) that previously read the complete EC-SI message set 200 in row 1 or the changed EC-SI type 2 message in row 2 and now reads any of the EC-SI messages 202, 204, 206 and 208 in row 4 would see that the overflow control bit 215 is changed to 1 and would therefore read the complete EC-SI message set 200 (i.e., EC-SI type 1 message 202, EC-SI type 2 message 204, EC-SI type 3 message 206, and EC-SI type 4 message 208). It should be noted in this example it depends on when the MS $194_2$ wakes up (due to DRX), it may not necessarily read each row within FIG. 3. Thus, the MS $1042_2$ will act differently depending on which bitmap (row) the MS $104_2$ read before reading the present bitmap (row).

Row 6 is the third change to the EC-SI type 2 message 204 within the current EC-SI Change Control Cycle where the EC-SI type 2 message's 1 bit change mark indicator $214_3$+overflow control bit 215=11 (note: the bitmap $212_3$=01111). At this point, a MS $104_2$ (for example) that previously read the complete EC-SI message set 200 in row 1 or any of the changed EC-SI messages in row 2 and 3 and now reads any of the EC-SI messages 202, 204, 206 and 208 in row 6 would see that the overflow control bit 215 is changed to 1 and would therefore read the complete EC-SI message set 200 (i.e., EC-SI type 1 message 202, EC-SI type 2 message 204, EC-SI type 3 message 206, and EC-SI type 4 message 208). A MS $104_2$ (for example) that previously read the changed EC-SI message 204 in row 4 and now reads any of the EC-SI messages 202, 204, 206 and 208 in row 6 would see that the value of the overflow control bit 215 is unchanged but the 1 bit change mark indicator $214_3$ for EC-SI type 2 message 204 and EC-SI type 3 message 206 are changed and hence the updated system information located therein needs to be read. The MS $104_2$ would not need to read EC-SI type 1 message 202 and the EC-SI type 4 message 208.

And the following change to the EC-SI type 2 message 204 can occur during the second EC-SI Change Control Cycle:

Row 9 is the first change to the EC-SI type 2 message 204 in the second EC-SI Change Control Cycle where the EC-SI type 2 message's 1 bit change mark indicator $214_3$+overflow control bit 215=01 (note: the bitmap $212_3$=01001). At this point, a MS $104_2$ (for example) that previously read the complete EC-SI message set 200 in either row 7 or 8 and now reads any of the EC-SI messages 202, 204, 206 and 208 in row 9 would know that the EC-SI type 2 message 204 has changed and hence needs to be read to obtain the updated system information located therein. If the MS $104_2$ last read an EC-SI message as of row 8 it would not read EC-SI type 1 message 202, the EC-SI type 3 message 206, and the EC-SI type 4 message 208 but this is only in case the MS $104_2$ previously read the updated EC SI in row 8 since the bitmap is changed between row 8 and row 9 (note: the value of the overflow control bit 215 has been "frozen" starting with row 7 since as of row 7 no change to any EC-SI message 202, 204, 206 208 has been made for the time period spanned by the EC-SI Change Control Cycle, thus none of the EC-SI 1 bit change mark indicators $214_3$ have been changed during this time. Since all MSs camping in the cell has read the complete EC-SI message set 200 as of row 7, the MS $104_2$ interprets row 9 as indicating no change to the overflow control bit 215 (i.e. a EC-SI overflow condition does not exist).

It should be appreciated that FIG. 3's row 7 suggests that immediately after the end of the first EC-SI CCC, the bitmap $212_3$ is "frozen" (reset) and a change to EC-SI 202 occurs when starting the second EC-SI CCC precisely at the point where the first EC-SI CCC ends. An alternative, would be to allow the end of the first EC-SI CCC to occur part way down row 7 where i.e. T+24 is precisely reached at some point down along the left hand edge of row 7 before the end of row 7 thereby allowing more than 24 hours to occur before the second EC-SI CCC starts in row 8. This is desirable because it allows for an indefinite period of time to occur between the end of any given EC-SI CCC and the start of the next EC-SI CCC which is what can be expected in typical networks.

In a forth embodiment of the present disclosure, a 6-bit bitmap $212_4$ providing a 1 bit change mark indicator $214_4$ per EC-SI message 202, 204, 206, 208 and an overflow control field 217 which comprises 2 bits is included in each EC-SI message 202, 204, 206, 208 (i.e., in each instance of EC-SI type 1 message 202, EC-SI type 2 message 204, EC-SI type 3 message 206, and EC-SI type 4 message 208) transmitted on the EC-BCCH 210 thus providing even more additional change mark information to the MS $104_2$ (for example) (see FIG. 2). With an overflow control field 217 of 2 bits, the network 106 (e.g., RAN node $102_2$) will be able to inform the MS $104_2$ (for example) of one individual change per EC-SI message 202, 204, 206 and 208 (i.e., using the relevant 1 bit change mark indicator(s) $214_4$ the MS $104_2$ may then only read the changed EC-SI message(s) 202, 204, 206 and/or 208) and three additional changes of any EC-SI message 202, 204, 206 and 208 (in which case the 2 bits in the overflow control field 217 are changed, requiring the MS $104_2$ to re-read the complete EC-SI message set 200) during a given time frame, i.e., during one EC-SI Change Control Cycle.

In a fifth embodiment of the present disclosure, a 9-bit bitmap $212_5$ providing a 2 bit change mark indicator $214_5$ per EC-SI message 202, 204, 206, 208 and an overflow control bit 219 is included in each EC-SI message 202, 204, 206, 208 (i.e., in each instance of EC-SI type 1 message 202, EC-SI type 2 message 204, EC-SI type 3 message 206, and EC-SI type 4 message 208) transmitted on the EC-BCCH 210 thus providing additional change mark information to the MS $104_2$ (for example) (see FIG. 2). With this solution, the network 106 (e.g., RAN node $102_2$) will be able to inform the MS $104_2$ (for example) of three individual changes per EC-SI message 202, 204, 206 and 208 (i.e., the MS $104_2$ may then only read the changed EC-SI message(s) 202, 204, 206 and/or 208) and four additional changes of one EC-SI message 202, 204, 206 and 208 (in which case the overflow control bit 219 is changed, requiring the MS $104_2$ to re-read the complete EC-SI message set 200) during a given time frame, i.e., during one EC-SI Change Control Cycle (e.g., within or after a few minutes).

It should be noted that system information (SI) is normally not changed very frequently in a deployed cellular system 100, and thus, a change limitation of a maximum of three changes per e.g., 24 hours for a given EC-SI message 202, 204, 206 or 208 is considered to be enough in most scenarios.

In addition, it should be noted that the RAN node $102_2$ can set the bitmap $212_1$, $212_2$, $212_3$, $212_4$, $212_5$ including the overflow control bit(s) 215, 217, 219 (if any) and the change mark indicator(s) $214_1$, $214_2$, $214_3$, $214_4$, $214_5$ when one or more EC-SI messages 202, 204, 206, 208 are changed during a relatively short time frame (e.g., a few minutes) such that an indication of an overflow condition is avoided, and by that improve the EC-SI acquisition in the MS $104_2$ (for example). An example to illustrate this improvement is as follows, assume the RAN node $102_2$, upon determining that there have been no changes indicated for any of the EC-SI messages 202, 204, 206, 208 for a time period T determined by the EC-SI Change Control Cycle (where T starts at the point where the last change (most recent change) was indicated by EC-SI bitmap information and has a value that exceeds the longest possible DRX cycle supported by the network 100 for any MS $104_1$, $104_2$, $104_3$ ... $104_n$), considers the current bitmap $212_1$, $212_2$, $212_3$, $212_4$, $212_5$ information as being known by all MSs $104_2$, $104_3$ ... $104_n$ in the cell. Therefore, the RAN node $102_2$ can once again start indicating individual EC-SI message changes and consider the state of the overflow control bit(s) 215, 217, 219 as being reset (or "frozen") at the point where the time since the last change (most recent change) indicated by EC-SI bitmap information exceeds time period T. Accordingly, the RAN node $102_2$ considers the last transmitted bitmap $212_1$, $212_2$, $212_3$, $212_4$, $212_5$ information as the new basis for indicating changes to specific EC-SI messages wherein the last transmitted value for the overflow control bit(s) 215, 217, 219 is now considered by all MSs $104_2$, $104_3$ ... $104_n$ as no longer indicating that an overflow condition has occurred (this is what is meant by the word "frozen" in the example shown with respect to FIG. 3). The MS $104_2$ (for example) implicitly detects a "frozen" condition ("reset" condition) of the bitmap $212_1$, $212_2$, $212_3$, $212_4$, $212_5$ in that the last received EC-SI message 202, 204, 206, 208 will have necessarily been received during the period of EC-SI message stability such that new changes to EC-SI message specific bits $214_1$, $214_2$, $214_3$, $214_4$, $214_5$ in the bitmap $212_1$, $212_2$, $212_3$, $212_4$, $212_5$ (relative to the last received values for these bits $214_1$, $214_2$, $214_3$, $214_4$, $214_5$) in the bitmap $212_1$, $212_2$, $212_3$, $212_4$, $212_5$) now indicate changes to the corresponding EC-SI messages 202, 204, 206, 208 as long as the value(s) of the overflow bit(s) 215, 217, 219 remains static.

Basic Functionalities-Configurations of RAN Node $102_2$ (For Example) and MS $104_2$ (For Example)

Referring to FIG. 4, there is a flowchart of a method 400 implemented in the RAN node $102_2$ (e.g., BSS $102_2$) configured to interact with one or more mobile stations $104_2$, $104_3$ ... $104_n$ in accordance with an embodiment of the present disclosure. At step 402, the RAN node $102_2$ transmits, to the mobile stations $104_2$, $104_3$ ... $104_n$, an EC-SI message 202, 204, 206 or 208 on the EC-BCCH 210. The transmitted EC-SI message 202, 204, 206 or 208 is from a set of EC-SI messages 200 including an EC-SI type 1 message 202, an EC-SI type 2 message 204, an EC-SI type 3 message 206, and an EC-SI type 4 message 208. The transmitted EC-SI message 202, 204, 206 or 208 includes a bitmap $212_1$, $212_2$, $212_3$, $212_4$, $212_5$, that indicates which if any of one or more of the EC-SI type 1 message 202, the EC-SI type 2 message 204, the EC-SI type 3 message 206, and the EC-SI type 4 message 208 from the set of EC-SI messages 200 has been modified relative to the previous instance of the transmission for these messages 202, 204, 206, 208 (recall: the RAN node $102_2$ sequentially transmits on a known periodic basis the EC-SI type 1 message 202, the EC-SI type 2 message 204, the EC-SI type 3 message 206, and the EC-SI type 4 message 208). In the first embodiment, the bitmap $212_2$ includes a two-bit change mark indicator $214_1$ for each of the EC-SI type 1 message 202, the EC-SI type 2 message 204, the EC-SI type 3 message 206, and the EC-SI type 4 message 208. In the second embodiment, the bitmap $212_2$ includes a one-bit change mark indicator $214_2$ for each of the EC-SI type 1 message 202, the EC-SI type 2 message 204, the EC-SI type 3 message 206, and the EC-SI type 4 message 208. In the third embodiment, the bitmap $212_3$ includes an overflow control bit 215 and a one-bit change mark indicator $214_3$ for each of the EC-SI type 1 message 202, the EC-SI type 2 message 204, the EC-SI type 3 message 206, and the EC-SI type 4 message 208. In the fourth embodiment, the bitmap $212_4$ includes a two-bit overflow control field 217 and a one-bit change mark indicator $214_4$ for each of the EC-SI type 1 message 202, the EC-SI type 2 message 204, the EC-SI type 3 message 206, and the EC-SI type 4 message 208. In the fifth embodiment, the bitmap $212_5$ includes an overflow control bit 219 and a two-bit bit change mark indicator $214_5$ for each of the EC-SI type 1 message 202, the EC-SI type 2 message 204, the EC-SI type 3 message 206, and the EC-SI type 4 message 208. The one or more overflow control bits 215, 217, 219 indicates to the mobile stations $104_2$, $104_3$ ... $104_n$, where at least one of the EC-SI type 1 message 202, the EC-SI type 2 message 204, the EC-SI type 3 message 206, and the EC-SI type 4 message 208 has been modified excessively during a certain time period (e.g., the time period spanned by the EC-SI Change Control Cycle) and hence indicate to the mobile stations $104_2$, $104_3$ ... $104_1$, that they have to read each of the EC-SI type 1 message 202, the EC-SI type 2 message 204, the EC-SI type 3 message 206, and the EC-SI type 4 message 208. At step 404, the RAN node $102_2$ changes the bitmap $212_1$, $212_2$, $212_3$, $212_4$, $212_5$ for each modification to one or more of the EC-SI type 1 message 202, the EC-SI type 2 message 204, the EC-SI type 3 message 206, and the EC-SI type 4 message 208 during a predetermined time period (e.g., the time period spanned by the EC-SI Change Control Cycle) which improves the mobile stations $104_2$, $104_3$ ... $104_n$, acquisition of the EC-SI type 1 message 202, the EC-SI type 2 message 204, the EC-SI type 3 message 206, and the EC-SI type 4 message 208.

Referring to FIG. 5, there is a block diagram illustrating structures of an exemplary RAN node $102_2$ (e.g., BSS $102_2$) in accordance with an embodiment of the present disclosure. In one embodiment, the RAN node $102_2$ comprises a transmit module 502, and a change module 504. The transmit module 502 is configured to transmit, to the mobile stations $104_2$, $104_3$ ... $104_n$, an EC-SI message 202, 204, 206 or 208 on the EC-BCCH 210. The transmitted EC-SI message 202, 204, 206 or 208 is from a set of EC-SI messages 200 including an EC-SI type 1 message 202, an EC-SI type 2 message 204, an EC-SI type 3 message 206, and an EC-SI type 4 message 208. The transmitted EC-SI message 202, 204, 206 or 208 includes a bitmap $212_1$, $212_2$, $212_3$, $212_4$, $212_5$, that indicates which if any of one or more of the EC-SI type 1 message 202, the EC-SI type 2 message 204, the EC-SI type 3 message 206, and the EC-SI type 4 message 208 from the set of EC-SI messages 200 has been modified relative to the previous instance of the transmission for these messages 202, 204, 206, 208. The change module 504 is configured to change the bitmap $212_1$, $212_2$, $212_3$, $212_4$, $212_5$ for each modification to one or more of the EC-SI type 1 message 202, the EC-SI type 2 message 204, the EC-SI type 3 message 206, and the EC-SI type 4 message 208 during a predetermined time period (e.g., the time period spanned by the EC-SI Change Control Cycle). In addition, it should be noted that the RAN node $102_2$ may also include other components, modules or structures which are well-known, but for clarity, only the components, modules or structures needed to describe the features of the present disclosure are described herein.

As those skilled in the art will appreciate, the above-described modules 502, and 504 of the RAN node $102_2$ may be implemented separately as suitable dedicated circuits. Further, the modules 502, and 504 can also be implemented using any number of dedicated circuits through functional combination or separation. In some embodiments, the modules 502, and 504 may be even combined in a single application specific integrated circuit (ASIC). As an alternative software-based implementation, the RAN node $102_2$ may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ to perform the steps of the above-described method 400. Note: the other RAN node $102_1$ (plus other RAN nodes not shown) may be configured the same as RAN node $102_2$.

Figure 6:
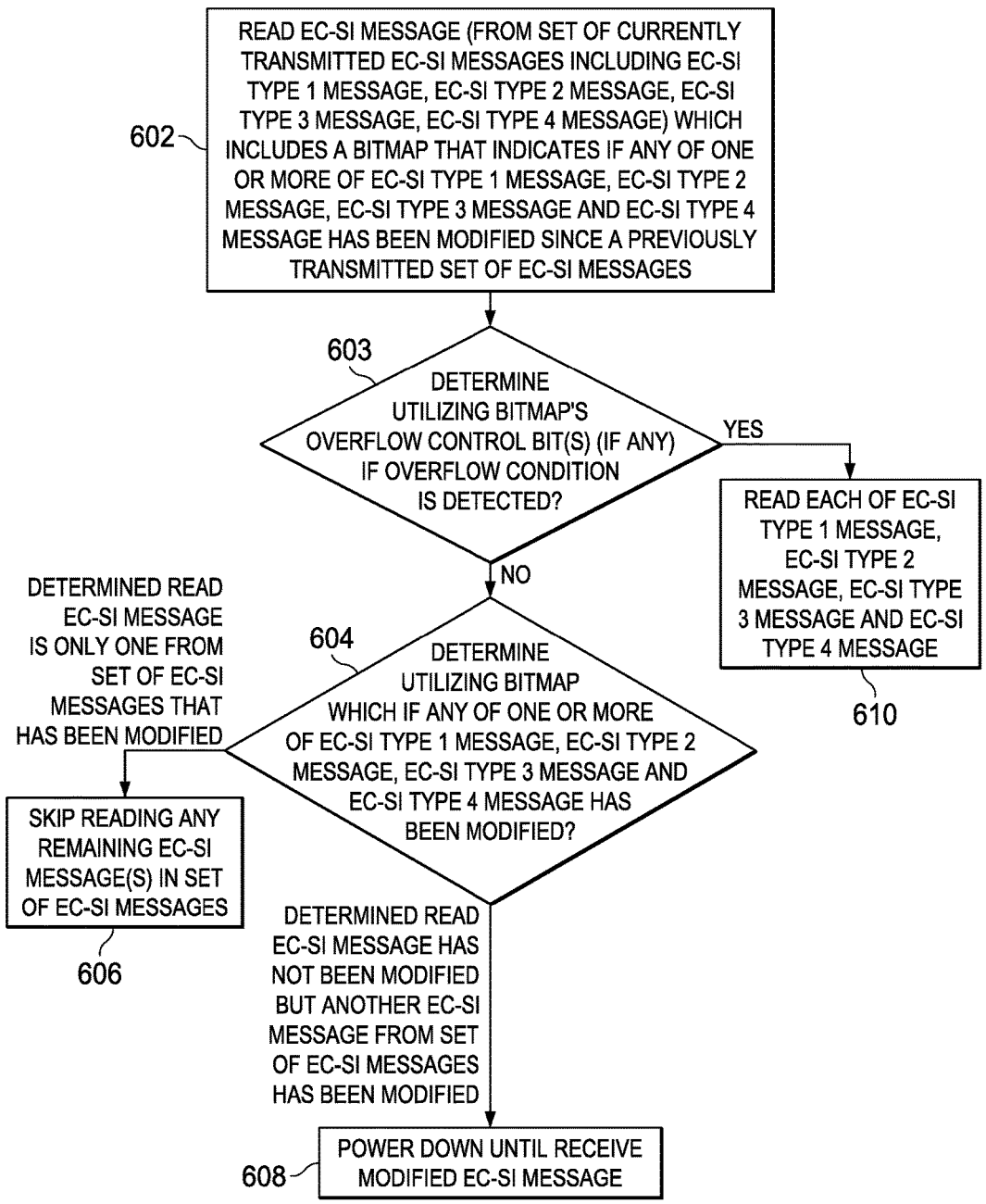
FIG. 6 is a flowchart of a method implemented in the mobile station in accordance with an embodiment of the present disclosure; and, FIG. 7 is a block diagram illustrating a structure of the mobile station configured in accordance with an embodiment of the present disclosure.

Referring to FIG. 6, there is a flowchart of a method 600 implemented in the mobile station $104_2$ (for example) in accordance with an embodiment of the present disclosure. At step 602, the mobile station $104_2$ reads (receives) an EC-SI message 202, 204, 206 or 208 on the EC-BCCH 210. The read EC-SI message 202, 204, 206 or 208 is from a set of EC-SI messages 200 including an EC-SI type 1 message 202, an EC-SI type 2 message 204, an EC-SI type 3 message 206, and an EC-SI type 4 message 208. The read EC-SI message 202, 204, 206 or 208 includes a bitmap $212_1$, $212_2$, $212_3$, $212_4$, $212_5$, that indicates which if any of one or more of the EC-SI type 1 message 202, the EC-SI type 2 message 204, the EC-SI type 3 message 206, and the EC-SI type 4 message 208 from the set of EC-SI messages 200 has been modified relative to the previous instance of the RAN node $102_2$ transmitting these messages 202, 204, 206, 208. At step 603, the mobile station $104_2$ determines utilizing the bitmap $212_1$, $212_2$, $212_3$, $212_4$, $212_5$'s overflow control bit(s) 215, 217, 219 (if any) within the read EC-SI message 202, 204, 206 or 208 if an overflow condition is detected. If result of step 603 is yes, the mobile station $104_2$ at step 610 reads each of the EC-SI type 1 message 202, the EC-SI type 2 message 204, the EC-SI type 3 message 206, and the EC-SI type 4 message 208. If result of step 603 is no, the mobile station $104_2$ at step 604 determines utilizing the bitmap $212_1$, $212_2$, $212_3$, $212_4$, $212_5$ within the read EC-SI message 202, 204, 206 or 208 which if any of the one or more of the EC-SI type 1 message 202, the EC-SI type 2 message 204, the EC-SI type 3 message 206, and the EC-SI type 4 message 208 from the set of EC-SI messages has been modified relative to the previous instance of the RAN node $102_2$ transmitting these messages 202, 204, 206, 208. At step 606, the mobile station $104_2$ based on the determination that the read EC-SI message 202, 204, 206 or 208 is the only one from the set of EC-SI messages 200 that has been modified, skips reading any remaining EC-SI message(s) 202, 204, 206, or 208 in the set of EC-SI messages 200. At step 608, the mobile station $104_2$ based on the determination that the read EC-SI message 202, 204, 206 or 208 has not been modified but another EC-SI message 202, 204, 206 and/or 208 from the set of EC-SI messages 200 has been modified, powers down until the modified EC-SI message 202, 204, 206 and/or 208 is due to be received and then powers-up to read the modified EC-SI message 202, 204, 206 and/or 208.

Referring to FIG. 7, there is a block diagram illustrating structures of an exemplary mobile station $104_2$ (for example) in accordance with an embodiment of the present disclosure. In one embodiment, the mobile station $104_2$ comprises a first read module 702, a first determine module 703, a second determine module 704, a skip reading module 706, a power down module 708, and second read module 710. The read module 702 is configured to read (receive) an EC-SI message 202, 204, 206 or 208 on the EC-BCCH 210. The read EC-SI message 202, 204, 206 or 208 is from a set of EC-SI messages 200 including an EC-SI type 1 message 202, an EC-SI type 2 message 204, an EC-SI type 3 message 206, and an EC-SI type 4 message 208. The read EC-SI message 202, 204, 206 or 208 includes a bitmap $212_1$, $212_2$, $212_3$, $212_4$, $212_5$, that indicates which if any of one or more of the EC-SI type 1 message 202, the EC-SI type 2 message 204, the EC-SI type 3 message 206, and the EC-SI type 4 message 208 from the set of EC-SI messages 200 has been modified relative to the previous instance of the RAN node $102_2$ transmitting these messages 202, 204, 206, 208. The first determine module 703 is configured to determine utilizing the bitmap $212_1$, $212_2$, $212_3$, $212_4$, $212_5$'s overflow control bit(s) 215, 217, 219 (if any) within the read EC-SI message 202, 204, 206 or 208 if an overflow condition is detected. Based on the detection of an overflow condition, the second read module 710 is configured to read each of the EC-SI type 1 message 202, the EC-SI type 2 message 204, the EC-SI type 3 message 206, and the EC-SI type 4 message 208. Based on there being no detected overflow condition (or there being no overflow control bit(s) 215, 217, 219), the second determine module 704 is configured to determine utilizing the bitmap $212_1$, $212_2$, $212_3$, $212_4$, $212_5$ within the read EC-SI message 202, 204, 206 or 208 which if any of the one or more of the EC-SI type 1 message 202, the EC-SI type 2 message 204, the EC-SI type 3 message 206, and the EC-SI type 4 message 208 from the set of EC-SI messages 200 has been modified. Based on the determination that the read EC-SI message 202, 204, 206 or 208 is the only one from the set of EC-SI messages 200 that has been modified, the skip reading module 706 is configured to skip reading any remaining EC-SI message(s) 202, 204, 206, or 208 in the set of EC-SI messages 200. Based on the determination that the read EC-SI message 202, 204, 206 or 208 has not been modified but another EC-SI message 202, 204, 206 and/or 208 from the set of EC-SI messages 200 has been modified, the power down module 708 is configured to power down until the modified EC-SI message 202, 204, 206 and/or 208 is due to be received and then power-up to read the modified EC-SI message 202, 204, 206 and/or 208. In addition, it should be noted that the mobile station $104_2$ may also include other components, modules or structures which are well-known, but for clarity, only the components, modules or structures needed to describe the features of the present disclosure are described herein.

As those skilled in the art will appreciate, the above-described modules 702, 703, 704, 706, 708, and 710 of the mobile station $104_2$ may be implemented separately as suitable dedicated circuits. Further, the modules 702, 703, 704, 706, 708, and 710 can also be implemented using any number of dedicated circuits through functional combination or separation. In some embodiments, the modules 702, 703, 704, 706, 708, and 710 may be even combined in a single application specific integrated circuit (ASIC). As an alternative software-based implementation, the mobile station $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the mobile station $104_2$ to perform the steps of the above-described method 600. Note: the other mobile stations $104_1$, $104_3$, $104_n$ may be configured the same as mobile station $104_2$.

In view of the foregoing, one skilled in the art will appreciate that the present disclosure has many advantages some of which are as follows:

The MSs $104_1, 104_2, 104_3 \ldots 104_n$ can avoid reading too frequently the complete EC-System Information message set 200 which not only saves a lot of battery power but also improves network access (i.e., the time required for reading four EC-SI messages 202, 204, 206, 208 on the EC-BCCH 210 is approximately 16 seconds for any MS $104_1, 104_2, 104_3 \ldots 104_n$ using the worst coverage class (CC4), assuming one EC-BCCH block carries one complete EC-SI message—hence not having to frequently read four EC-SI messages 202, 204, 206, 208 per the present disclosure is advantageous for the above reasons).

The MSs $104_1, 104_2, 104_3 \ldots 104_n$ will also avoid wasting valuable battery power by not having to acquire and decode EC-SI messages that are in fact unchanged.

The MSs $104_1, 104_2, 104_3 \ldots 104_n$ are provided with a bitmap $212_1, 212_2, 212_3, 212_4$ or $212_5$ within each EC-SI message 202, 204, 206 and 208 whereby the MSs $104_1, 104_2, 104_3 \ldots 104_n$ is not always required to read the complete EC-System Information set 200.

The present disclosure will shorten the time for re-reading the EC-System Information messages 202, 204, 206, 208, which thus shortens the network access time for the MSs $104_1, 104_2, 104_3 \ldots 104_n$.

The MSs $104_1, 104_2, 104_3 \ldots 104_n$ utilizing the disclosed techniques will save power capacity which will contribute to a longer battery life time for the MSs $104_1, 104_2, 104_3 \ldots 104_n$.

In addition to the aforementioned disclosure, there is an improvement that can help to ensure the MSs $104_1, 104_2, 104_3 \ldots 104_n$ has even more timely access to the latest EC-System Information 202, 204, 206, 208 whereby multiple overflow conditions and corresponding "reset" conditions can occur during the time period spanned by EC-SI CCC which is discussed above as being 24 hours. In this case, the RAN node $102_2$ can utilize a different minimum period of stability following the most recent change to one or more EC-SI messages other than the EC-SI CCC for determining when a "reset" condition has occurred following an overflow condition. This different minimum period of stability can be referred to as a Bitmap CCC and can have a duration that exceeds the longest DRX cycle (e.g., 60 minutes) that is less than the 24 hours of the EC-SI CCC. Using a Bitmap CCC of 60 minutes will allow for up 24 "reset" conditions to occur during an EC-SI CCC thereby allowing a MS to avoid always concluding that it has to read all EC-SI messages each time it acquires one or more EC-SI messages following an overflow condition that occurs and continues to be indicated for the time period spanned by the EC-SI CCC. Allowing for this increased number of "reset" conditions during the EC-SI CCC leads to a MS battery savings advantage since a MS can stop reading all EC-SI messages following each Bitmap CCC based "reset" condition until the next overflow condition (if any) that occurs during any given EC-SI CCC.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A radio access network (RAN) node configured to interact with one or more mobile stations, the RAN node comprising:
   a processor; and,
   a memory that stores processor-executable instructions, wherein the processor interfaces with the memory to execute the processor-executable instructions, whereby the RAN node is operable to:
   transmit, to the one or more mobile stations, an Extended Coverage-System Information (EC-SI) message on an Extended Coverage-Broadcast Control Channel (EC-BCCH), wherein the transmitted EC-SI message is from a set of currently transmitted EC-SI messages including an EC-SI type 1 message, an EC-SI type 2 message, an EC-SI type 3 message, and an EC-SI type 4 message, and wherein the transmitted EC-SI message includes a bitmap that indicates which if any of one or more of the EC-SI type 1 message, the EC-SI type 2 message, the EC-SI type 3 message, and the EC-SI type 4 message from the set of currently transmitted EC-SI messages has been modified since a previously transmitted set of EC-SI messages; and
   change the bitmap for each modification to one or more of the EC-SI type 1 message, the EC-SI type 2 message, the EC-SI type 3 message, and the EC-SI type 4 message during a predetermined time period spanned by one EC-SI Change Control Cycle thereby improving the ability for one or more mobile stations to determine which specific EC-SI messages have changed and thereby improving mobile station efficiency of acquiring the EC-SI type 1 message, the EC-SI type 2 message, the EC-SI type 3 message, and the EC-SI type 4 message.

2. The RAN node of claim 1, wherein the bitmap includes a two-bit change mark indicator for each of the EC-SI type 1 message, the EC-SI type 2 message, the EC-SI type 3 message, and the EC-SI type 4 message.

3. The RAN node of claim 1, wherein the bitmap includes a one-bit change mark indicator for each of the EC-SI type 1 message, the EC-SI type 2 message, the EC-SI type 3 message, and the EC-SI type 4 message.

4. The RAN node of claim 1, wherein the bitmap includes an overflow control bit and a one-bit change mark indicator for each of the EC-SI type 1 message, the EC-SI type 2 message, the EC-SI type 3 message, and the EC-SI type 4 message.

5. The RAN node of claim 1, wherein the bitmap includes a two-bit overflow control field and a one-bit change mark indicator for each of the EC-SI type 1 message, the EC-SI type 2 message, the EC-SI type 3 message, and the EC-SI type 4 message.

6. The RAN node of claim 1, wherein the bitmap includes an overflow control bit and a two-bit change mark indicator for each of the EC-SI type 1 message, the EC-SI type 2 message, the EC-SI type 3 message, and the EC-SI type 4 message.

7. The RAN node of claim 1, wherein the bitmap includes one or more overflow control bits which indicates to the one or more mobile stations where at least one of the EC-SI type 1 message, the EC-SI type 2 message, the EC-SI type 3 message, and the EC-SI type 4 message has been modified more than once during the predetermined time period spanned by one EC-SI Change Control Cycle and hence indicates to the one or more mobile stations that they have to read each of the EC-SI type 1 message, the EC-SI type 2 message, the EC-SI type 3 message, and the EC-SI type 4 message.

8. A method in a radio access network (RAN) node configured to interact with one or more mobile stations, the method comprising:
   transmitting, to the one or more mobile stations, an Extended Coverage-System Information (EC-SI) message on an Extended Coverage-Broadcast Control Channel (EC-BCCH), wherein the transmitted EC-SI message is from a set of currently transmitted EC-SI messages including an EC-SI type 1 message, an EC-SI type 2 message, an EC-SI type 3 message, and an EC-SI type 4 message, and wherein the transmitted EC-SI message includes a bitmap that indicates which if any of one or more of the EC-SI type 1 message, the EC-SI type 2 message, the EC-SI type 3 message, and the EC-SI type 4 message from the currently transmitted set of EC-SI messages has been modified since a previously transmitted set of EC-SI messages; and
   changing the bitmap for each modification to one or more of the EC-SI type 1 message, the EC-SI type 2 message, the EC-SI type 3 message, and the EC-SI type 4 message during a predetermined time period spanned by one EC-SI Change Control Cycle thereby improving the ability for one or more mobile stations to determine which specific EC-SI messages have changed and thereby improving mobile station efficiency of acquiring the EC-SI type 1 message, the EC-SI type 2 message, the EC-SI type 3 message, and the EC-SI type 4 message.

9. The method of claim 8, wherein the bitmap includes a two-bit change mark indicator for each of the EC-SI type 1 message, the EC-SI type 2 message, the EC-SI type 3 message, and the EC-SI type 4 message.

10. The method of claim 8, wherein the bitmap includes a one-bit change mark indicator for each of the EC-SI type 1 message, the EC-SI type 2 message, the EC-SI type 3 message, and the EC-SI type 4 message.

11. The method of claim 8, wherein the bitmap includes an overflow control bit and a one-bit change mark indicator for each of the EC-SI type 1 message, the EC-SI type 2 message, the EC-SI type 3 message, and the EC-SI type 4 message.

12. The method of claim 8, wherein the bitmap includes a two-bit overflow control field and a one-bit change mark indicator for each of the EC-SI type 1 message, the EC-SI type 2 message, the EC-SI type 3 message, and the EC-SI type 4 message.

13. The method of claim 8, wherein the bitmap includes an overflow control bit and a two-bit change mark indicator for each of the EC-SI type 1 message, the EC-SI type 2 message, the EC-SI type 3 message, and the EC-SI type 4 message.

14. The method of claim 8, wherein the bitmap includes one or more overflow control bits which indicates to the one or more mobile stations where at least one of the EC-SI type 1 message, the EC-SI type 2 message, the EC-SI type 3 message, and the EC-SI type 4 message has been modified more than once during the predetermined time period spanned by one EC-SI Change Control Cycle and hence indicates to the one or more mobile stations that they have to read each of the EC-SI type 1 message, the EC-SI type 2 message, the EC-SI type 3 message, and the EC-SI type 4 message.

15. A mobile station comprising:
   a processor; and,
   a memory that stores processor-executable instructions, wherein the processor interfaces with the memory to execute the processor-executable instructions, whereby the mobile station is operable to:
      read an Extended Coverage-System Information (EC-SI) message on an Extended Coverage-Broadcast Control Channel (EC-BCCH), wherein the read EC-SI message is from a set of currently transmitted EC-SI messages including an EC-SI type 1 message, an EC-SI type 2 message, an EC-SI type 3 message, and an EC-SI type 4 message, and wherein the read EC-SI message includes a bitmap that indicates which if any of one or more of the EC-SI type 1 message, the EC-SI type 2 message, the EC-SI type 3 message, and the EC-SI type 4 message from the set of currently transmitted EC-SI messages has been modified during a predetermined time period spanned by one EC-SI Change Control Cycle since a previously transmitted set of EC-SI messages, wherein the bitmap is changed by a radio access network (RAN) node for each modification to one or more of the EC-SI type 1 message, the EC-SI type 2 message, the EC-SI type 3 message, and the EC-SI type 4 message during the predetermined time period spanned by the one EC-SI Change Control Cycle thereby improving the ability for the mobile station to determine which specific EC-SI messages have changed and thereby improving mobile station efficiency of acquiring the EC-SI type 1 message, the EC-SI type 2 message, the EC-SI type 3 message, and the EC-SI type 4 message.

16. The mobile station of claim 15, wherein the mobile station is further operable to:
   determine by reading one or more overflow control bits, if any, within the bitmap of the read EC-SI message whether there is an overflow condition.

17. The mobile station of claim 16, wherein the mobile station when determining there is an overflow condition is further operable to:
 read each of the EC-SI type 1 message, the EC-SI type 2 message, the EC-SI type 3 message, and the EC-SI type 4 message.

18. The mobile station of claim 16, wherein the mobile station when determining there is not an overflow condition is further operable to:
 determine, utilizing the bitmap within the read EC-SI message, which if any of the one or more of the EC-SI type 1 message, the EC-SI type 2 message, the EC-SI type 3 message, and the EC-SI type 4 message from the set of currently transmitted EC-SI messages has been modified during the predetermined time period spanned by one EC-SI Change Control Cycle since a previously transmitted set of EC-SI messages.

19. The mobile station of claim 18, wherein the mobile station is further operable to:
 based on the determination that the read EC-SI message is the only one from the set of currently transmitted EC-SI messages that has been modified during the predetermined time period spanned by one EC-SI Change Control Cycle since the previously transmitted set of EC-SI messages, skip reading any remaining EC-SI message(s) in the set of currently transmitted EC-SI messages.

20. The mobile station of claim 18, wherein the mobile station is further operable to:
 based on the determination that the read EC-SI message has not been modified during the predetermined time period spanned by one EC-SI Change Control Cycle since the previously transmitted set of EC-SI messages but another EC-SI message from the set of currently transmitted EC-SI messages has been modified during the predetermined time period spanned by one EC-SI Change Control Cycle since the previously transmitted set of EC-SI messages, power down until the modified EC-SI message is due to be received and then power-up to read the modified EC-SI message.

21. The mobile station of claim 15, wherein the bitmap includes a two-bit change mark indicator for each of the EC-SI type 1 message, the EC-SI type 2 message, the EC-SI type 3 message, and the EC-SI type 4 message.

22. The mobile station of claim 15, wherein the bitmap includes a one-bit change mark indicator for each of the EC-SI type 1 message, the EC-SI type 2 message, the EC-SI type 3 message, and the EC-SI type 4 message.

23. The mobile station of claim 15, wherein the bitmap includes an overflow control bit and a one-bit change mark indicator for each of the EC-SI type 1 message, the EC-SI type 2 message, the EC-SI type 3 message, and the EC-SI type 4 message.

24. The mobile station of claim 15, wherein the bitmap includes a two-bit overflow control field and a one-bit change mark indicator for each of the EC-SI type 1 message, the EC-SI type 2 message, the EC-SI type 3 message, and the EC-SI type 4 message.

25. The mobile station of claim 15, wherein the bitmap includes an overflow control bit and a two-bit change mark indicator for each of the EC-SI type 1 message, the EC-SI type 2 message, the EC-SI type 3 message, and the EC-SI type 4 message.

26. The mobile station of claim 15, wherein the bitmap includes one or more overflow control bits which indicates to the mobile station where at least one of the EC-SI type 1 message, the EC-SI type 2 message, the EC-SI type 3 message, and the EC-SI type 4 message has been modified more than once during the predetermined time period spanned by one EC-SI Change Control Cycle and hence indicates to the mobile station that they have to read each of the EC-SI type 1 message, the EC-SI type 2 message, the EC-SI type 3 message, and the EC-SI type 4 message.

27. A method in a mobile station, the method comprising:
 reading an Extended Coverage-System Information (EC-SI) message on an Extended Coverage-Broadcast Control Channel (EC-BCCH), wherein the read EC-SI message is from a set of currently transmitted EC-SI messages including an EC-SI type 1 message, an EC-SI type 2 message, an EC-SI type 3 message, and an EC-SI type 4 message, and wherein the read EC-SI message includes a bitmap that indicates which if any of one or more of the EC-SI type 1 message, the EC-SI type 2 message, the EC-SI type 3 message, and the EC-SI type 4 message from the set of currently transmitted EC-SI messages has been modified during a predetermined time period spanned by one EC-SI Change Control Cycle since a previously transmitted set of EC-SI messages, wherein the bitmap is changed by a radio access network (RAN) node for each modification to one or more of the EC-SI type 1 message, the EC-SI type 2 message, the EC-SI type 3 message, and the EC-SI type 4 message during the predetermined time period spanned by the one EC-SI Change Control Cycle thereby improving the ability for the mobile station to determine which specific EC-SI messages have changed and thereby improving mobile station efficiency of acquiring the EC-SI type 1 message, the EC-SI type 2 message, the EC-SI type 3 message, and the EC-SI type 4 message.

28. The method of claim 27, further comprising:
 determining by reading one or more overflow control bits, if any, within the bitmap of the read EC-SI message whether there is an overflow condition.

29. The method of claim 28, wherein when determining there is an overflow condition further comprising:
 reading each of the EC-SI type 1 message, the EC-SI type 2 message, the EC-SI type 3 message, and the EC-SI type 4 message.

30. The method of claim 28, wherein when determining there is not an overflow condition further comprising:
 determining, utilizing the bitmap within the read EC-SI message, which if any of the one or more of the EC-SI type 1 message, the EC-SI type 2 message, the EC-SI type 3 message, and the EC-SI type 4 message from the set of currently transmitted EC-SI messages has been modified during the predetermined time period spanned by one EC-SI Change Control Cycle since the previously transmitted set of EC-SI messages.

31. The method of claim 30, further comprising:
 based on the determination that the read EC-SI message is the only one from the set of currently transmitted EC-SI messages that has been modified during the predetermined time period spanned by one EC-SI Change Control Cycle since the previously transmitted set of EC-SI messages, skip reading any remaining EC-SI message(s) in the set of currently transmitted EC-SI messages.

32. The method of claim 30, further comprising:
 based on the determination that the read EC-SI message has not been modified during the predetermined time period spanned by one EC-SI Change Control Cycle since the previously transmitted set of EC-SI messages but another EC-SI message from the set of currently transmitted EC-SI messages has been modified during the predetermined time period spanned by one EC-SI Change Control Cycle since the previously transmitted set of EC-SI messages, powering down until the modified EC-SI message is due to be received and then power-up to read the modified EC-SI message.

33. The method of claim 27, wherein the bitmap includes a two-bit change mark indicator for each of the EC-SI type 1 message, the EC-SI type 2 message, the EC-SI type 3 message, and the EC-SI type 4 message.

34. The method of claim 27, wherein the bitmap includes a one-bit change mark indicator for each of the EC-SI type 1 message, the EC-SI type 2 message, the EC-SI type 3 message, and the EC-SI type 4 message.

35. The method of claim 27, wherein the bitmap includes an overflow control bit and a one-bit change mark indicator for each of the EC-SI type 1 message, the EC-SI type 2 message, the EC-SI type 3 message, and the EC-SI type 4 message.

36. The method of claim 27, wherein the bitmap includes a two-bit overflow control field and a one-bit change mark indicator for each of the EC-SI type 1 message, the EC-SI type 2 message, the EC-SI type 3 message, and the EC-SI type 4 message.

37. The method of claim 27, wherein the bitmap includes an overflow control bit and a two-bit change mark indicator for each of the EC-SI type 1 message, the EC-SI type 2 message, the EC-SI type 3 message, and the EC-SI type 4 message.

38. The method of claim 27, wherein the bitmap includes one or more overflow control bits which indicates to the mobile station where at least one of the EC-SI type 1 message, the EC-SI type 2 message, the EC-SI type 3 message, and the EC-SI type 4 message has been modified more than once during the predetermined time period spanned by one EC-SI Change Control Cycle and hence indicates to the mobile station that they have to read each of the EC-SI type 1 message, the EC-SI type 2 message, the EC-SI type 3 message, and the EC-SI type 4 message.

* * * * *